J. G. VINCENT.
MOTOR VEHICLE.
APPLICATION FILED OCT. 12, 1916.
1,424,693.
Patented Aug. 1, 1922.
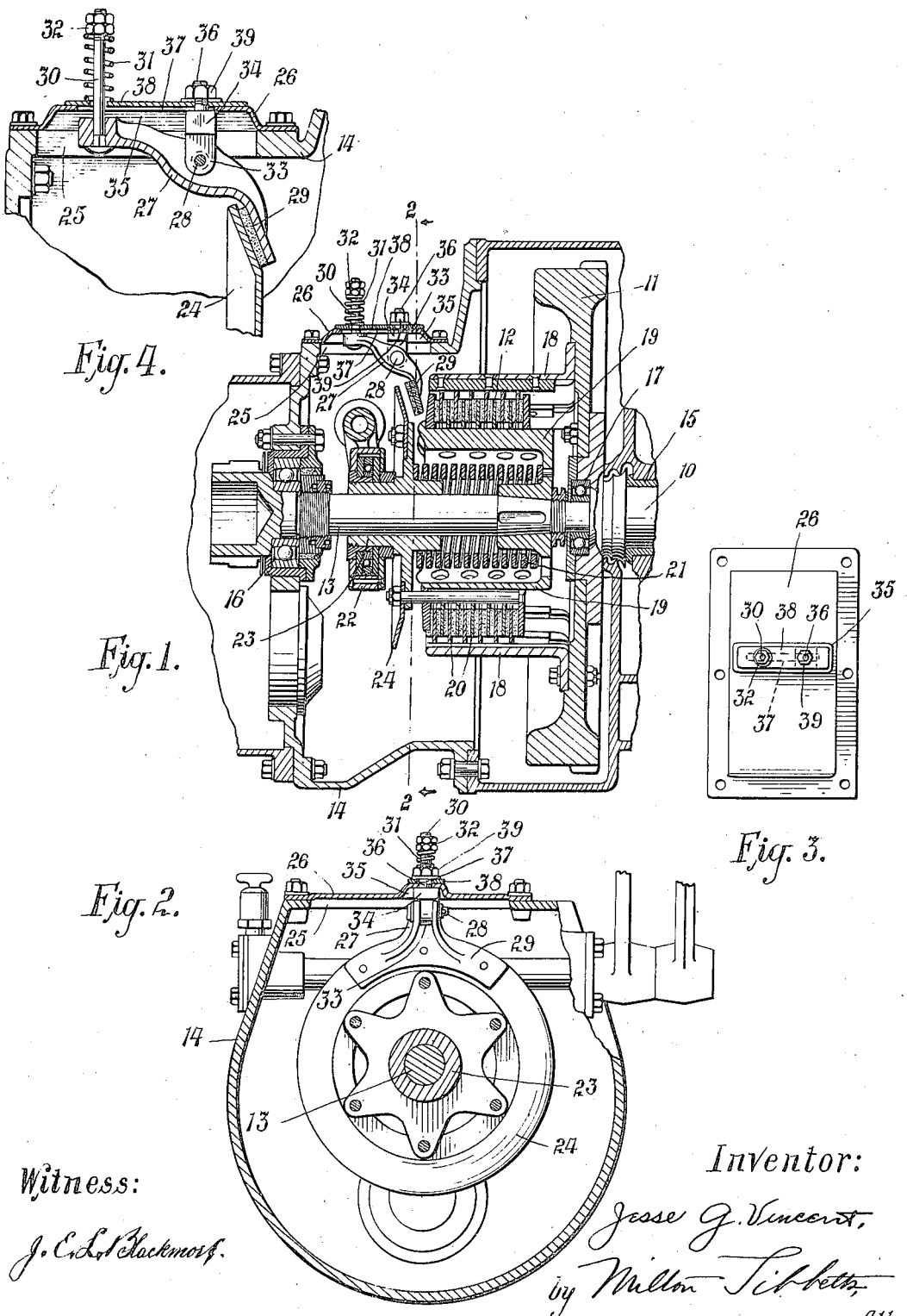

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

1,424,693.  Specification of Letters Patent.  Patented Aug. 1, 1922.

Application filed October 12, 1916. Serial No. 125,222.

*To all whom it may concern:*

Be it known that I, JESSE G. VINCENT, a citizen of the United States, and resident of Detroit, Wayne County, State of Michigan, have invented certain new and useful Improvements in Motor Vehicles, of which the following is a specification.

This invention relates to motor vehicles and particularly to the clutch mechanism thereof.

One of the objects of the invention is to provide a simple and efficient form of brake for the clutch of a motor vehicle.

Another object of the invention is to provide a clutch brake that may have its various parts assembled and the brake as a whole readily applied to and removed from the clutch casing.

Another object of the invention is to provide a clutch brake that is bodily adjustable relatively to and longitudinally of the axis of the clutch.

Other objects of the invention will appear from the following description taken in connection with the drawings which form a part of this specification, and in which, Fig. 1 is a vertical longitudinal section through a clutch and associated parts of a motor vehicle embodying the invention;

Fig. 2 is a vertical transverse section approximately on the line 2—2 of Fig. 1;

Fig. 3 is a detail plan view of the clutch casing cover; and

Fig. 4 is an enlarged detail view.

Referring to the drawings, 10 represents a motor vehicle crank shaft and 11 is a flywheel secured thereto. These parts constitute the driving element of a clutch 12. 13 is a shaft axially aligned with the shaft 10 and constitutes the driven element of the clutch. A casing 14 surrounds all of these parts, housing and supporting them. The shaft 10 has a bearing 15 in the casing and the shaft 13 has a bearing 16 therein and a bearing 17 for its front end in the end of the shaft 10.

The clutch 12 comprises an outer drum 18 an inner durm 19, interengaging disks 20, a clutch spring 21, a sleeve 23, and a shifter collar 22 by which the clutch is operated. The clutch is of the usual dry plate or disk form and its construction and operation will be readily understood, it is believed, from the drawings and the above description. It is shown in engaged position in Fig. 1, and the shifter collar 22 is adapted to move the sleeve 23 to the right on the shaft 13 to compress the spring 21 to disengage the plates 20 from clutching contact. In other words the spring 21 yieldingly retains the clutch in engaged position.

When a clutch of the above type is used in motor vehicles in connection with sliding gear changing mechanism, it is found desirable to quickly stop the shaft 13 from spinning as soon as the clutch is released. This is for the purpose of facilitating the gear change, and in the present invention a simple and effective form of clutch brake is used to retard the rotation or stop the spinning of said shaft 13. The form of the invention shown in the drawing will now be described.

Upon the sleeve 23 is formed or secured a disk 24 which is shown as of slightly conical shape. Immediately above this disk the casing 14 is formed with an opening 25 which gives easy access to the various parts of the clutch. This opening is closed by a detachable cover 26 and upon the inside of the cover is mounted a clutch brake 27. This brake is in the form of a lever pivoted at 28 and having a shoe part 29 which is adapted to co-operate with the disk 24 herein above described, and a part 30 which is in the form of a shank and extends through the cover 26 to the outside thereof. Surrounding the shank 30 is a spring 31 adjustable as by nut 32. The pivot 28 is on a bracket 33 which has a squared portion 34 adapted to set in a pressed up part 35 of the cover 26, and it is also formed with a bolt part 36 which extends through a slot 37 in this pressed up part of said cover. A plate 38 is adapted to cover the slot 37 and the bolt 36 also extends through this plate, a nut 39 securing the bracket 33 to the plate and cover. It will be undersood that by loosening the nut 39 the bracket 33 may be moved in the slot 37, the plate 38 moving with it, and the clutch brake will thereby be bodily adjusted longitudinally of or parallel to the axis of the clutch. The shank 30 of the clutch brake also extends through the slot 37 and through the plate 38 so that the bottom of the spring 31 rests on said plate.

From the above description it will be seen that as the clutch collar 23 is moved to the right in Fig. 1 to release the clutch, the disk 24 will come into contact with the shoe 29 of the clutch brake, and any further movement of the collar will cause the clutch brake to move on its pivot 28 and compress the spring 31 thereby increasing the friction of the disk 24 against the shoe 29 and consequently retarding the rotation of the collar 23 and consequently the shaft 13 to a greater degree. When the clutch is re-engaged, the reverse operation of the clutch brake takes place and when the clutch is fully engaged there is, of course, no contact and consequently no drag between the disk 24 and the clutch brake.

It will be understood further that the entire clutch brake may be assembled on the cover 26 and the cover and the assembled brake may then be applied to the opening 25 in the casing 14 after the clutch is in place therein. The clutch brake may then be bodily moved longitudinally of the clutch for the purpose of obtaining the correct brake action. The clutch brake may also be adjusted to compensate for wear that may take place in the clutch plates.

It will be understood that other forms and constructions may be made without departing from the spirit or scope of the invention as defined by the claims.

Having thus described my invention, what I claim and desire to secure by Letters Patent is:—

1. The combination with a clutch and a casing covering said clutch, of a disk mounted on the driven member of the clutch and movable as the clutch is disengaged, and a brake pivotally mounted on the inside of the casing and cooperating with said disk.

2. The combination with a clutch and a casing therefor, of a disk mounted on the movable member of the clutch and a spring controlled brake pivotally mounted on the inside of said casing and having a shoe adapted to contact with said disk.

3. The combination with a clutch and the casing therefor, of a disk mounted on the movable member of the clutch, said casing having an opening above said disk, a cover for said opening, and a clutch brake mounted on said cover.

4. The combination with a clutch and the casing therefor, of a disk mounted on the movable member of the clutch, said casing having an opening above said disk, a cover for said opening, a clutch brake mounted on said cover, and means for bodily adjusting said clutch brake relatively to the clutch.

5. The combination with a clutch, and a casing enclosing said clutch, of a pivotally supported clutch brake carried by said casing, and means for adjusting the pivotal support of said brake longitudinally of the clutch axis.

6. The combination with a clutch and a casing therefor, of a clutch brake comprising a lever pivoted in the casing and having a part adapted to act on said clutch as a brake and another part extending through the casing, a spring on the part extending through the casing, and means for bodily shifting said clutch brake relatively to the clutch.

7. The combination with a clutch and a casing therefor, of a clutch brake comprising a lever pivoted in the casing and having a shoe adapted to act on said clutch to stop spinning thereof and having a shank extending through the casing to the outside thereof, an adjustable spring on said shank, and means for bodily shifting the clutch brake longitudinally of the clutch axis.

8. The combination with a clutch and a casing around the clutch, said casing having an opening in its wall, a removable cover for said opening, and a clutch brake mounted upon and removable with said cover and adapted to retard the rotation of one of the clutch members when the clutch is disengaged.

9. The combination with a clutch and a casing therefor, said casing having an opening in its wall, a cover removably secured over said opening, a brake supporting means adjustably mounted on said cover and removable therewith, and a brake mounted on said means and cooperating with one of the clutch members.

10. In a motor vehicle, in combination, a clutch casing having a removable cover, a clutch within the casing, and a brake carried by said cover arranged to retard the rotation of the driven member of the clutch when the clutch is disengaged.

11. In combination with a clutch casing having a removable cover, a clutch within the casing, means for retarding the rotation of the driven clutch member when the clutch is disengaged including a support removably fastened to said cover and a brake member mounted on said support.

12. In combination with a clutch casing having a removable cover, a clutch therein, a brake member arranged to retard the rotation of the driven clutch member, when the clutch is disengaged, said brake member being mounted on said cover for adjustment axially of the clutch.

13. In combination with a clutch casing having a removable cover, a clutch therein, a support secured to the cover by a bolt and slot connection, the slot being parallel with the axis of the clutch and a brake member carried by said support arranged to retard the rotation of the driven clutch member when the clutch is disengaged.

In testimony whereof I affix my signature.

JESSE G. VINCENT.